United States Patent [19]

Yamaguchi et al.

[11] Patent Number: 5,485,223
[45] Date of Patent: Jan. 16, 1996

[54] NOISE REDUCING APPARATUS

[75] Inventors: Kazunari Yamaguchi, Settsu; Atsuhisa Kageyama, Ibaraki, both of Japan

[73] Assignee: Matsushita Electric Industrial Co., Ltd., Osaka, Japan

[21] Appl. No.: 283,636

[22] Filed: Aug. 1, 1994

[30] Foreign Application Priority Data

Sep. 16, 1993 [JP] Japan ................. 5-229972

[51] Int. Cl.⁶ ..................................... H04N 9/64
[52] U.S. Cl. ........................... 348/622; 348/624
[58] Field of Search ................. 358/36, 39, 40, 358/167; 348/607, 609, 610, 612, 618, 619, 621, 622, 623, 624, 712, 713; H04N 9/64, 5/213, 5/21

[56] References Cited

U.S. PATENT DOCUMENTS 4,571,613  2/1986  Fukuda ..................... 348/622

FOREIGN PATENT DOCUMENTS

63-250989  10/1988  Japan .
1-307389  12/1989  Japan .
2-231890  9/1990  Japan .

*Primary Examiner*—David E. Harvey
*Attorney, Agent, or Firm*—Ratner & Prestia

[57] ABSTRACT

A noise reducing apparatus includes a delay device for delaying a first video signal by one horizontal period. Also included is a first subtracter for subtracting the output of the delay device from an input video signal and a limiter for clipping the output of the first subtracter at a designated level. A variable coefficient-multiplier is also provided for multiplying the output of the limiter by a variable coefficient k where 0<k<1. A second subtracter subtracts the output of the variable coefficient multiplier from the input video signal and an adder adds the output of the first subtracter and the output of the limiter. A coefficient multiplier is also provided for multiplying the output of the adder by a fixed value 0.5. A third subtracter subtracts the output of the coefficient multiplier from the input video signal and a correlation detector provides a signal to control the coefficient value of the variable coefficient multiplier in response to the output of the first subtracter.

3 Claims, 7 Drawing Sheets

NOISE REDUCING APPARATUS

BACKGROUND OF THE INVENTION (1) Field of the Invention

The present invention relates to a noise reducing apparatus for reducing a noise component included in a video signal.

(2) Description of the Prior Art

Noise reducing apparatus for reducing luminance noise or color noise are widely employed in home video cassette recorders used for replaying video. Noise reducing apparatus using a line-recursive process are generally used, however, these noise reducing apparatus have a problem. Specifically, a downward color bleeding phenomenon occurs at an area in which picture brightness varys vertically in the picture. This area is the vertical boundary area.

In order to solve the above problem, for example, Japanese Laid-Open No. 2-(1990)-231890, incorporated herein by reference, discloses a method which is employed to detect a color signal corresponding to the vertical boundary area and to control that vertical boundary area using a coefficient value k in a coefficient multiplier.

Figure 1:
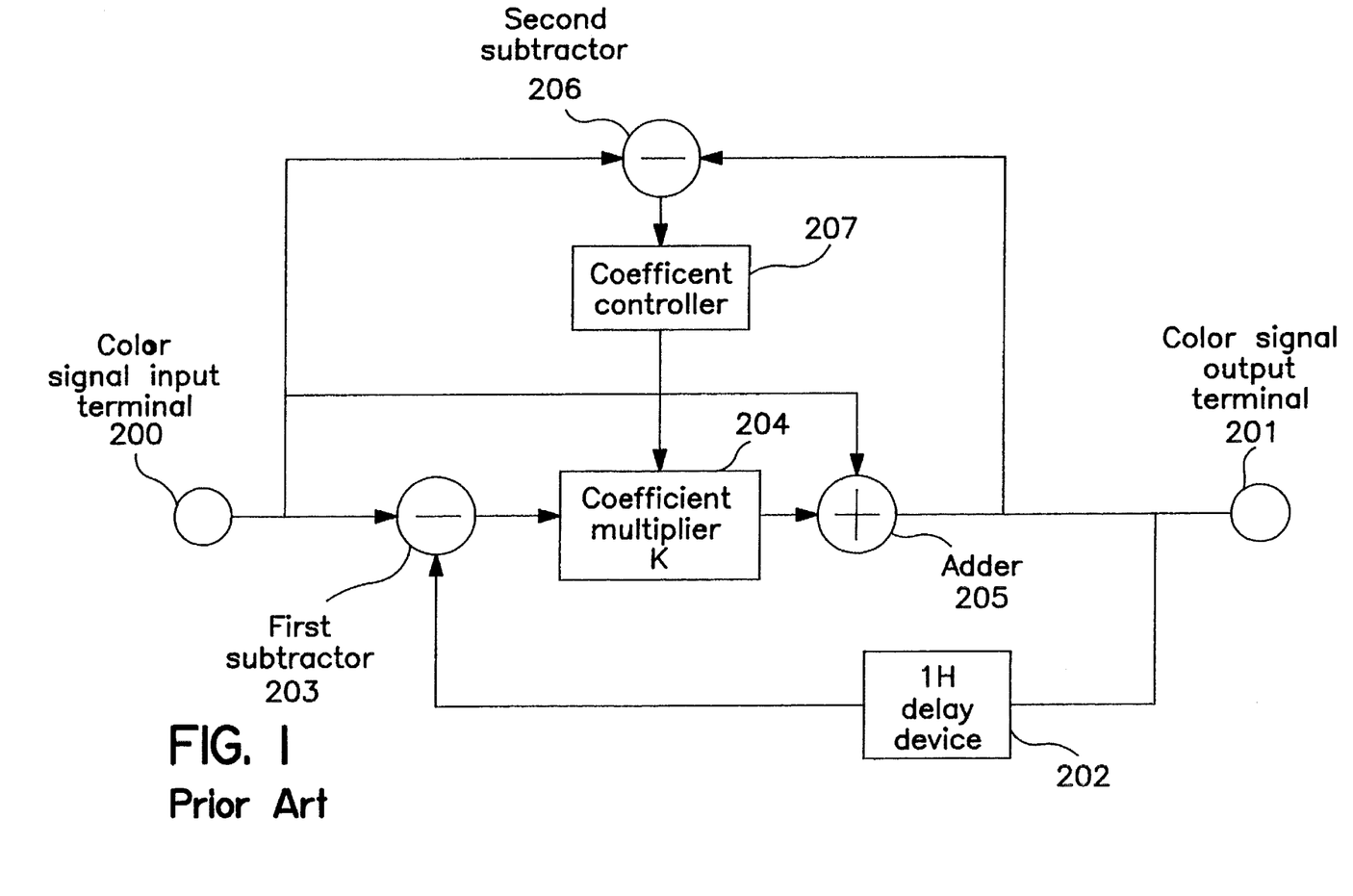
FIG. 1 is a block diagram of a noise reducing apparatus in accordance with the prior art.
Figure 2:
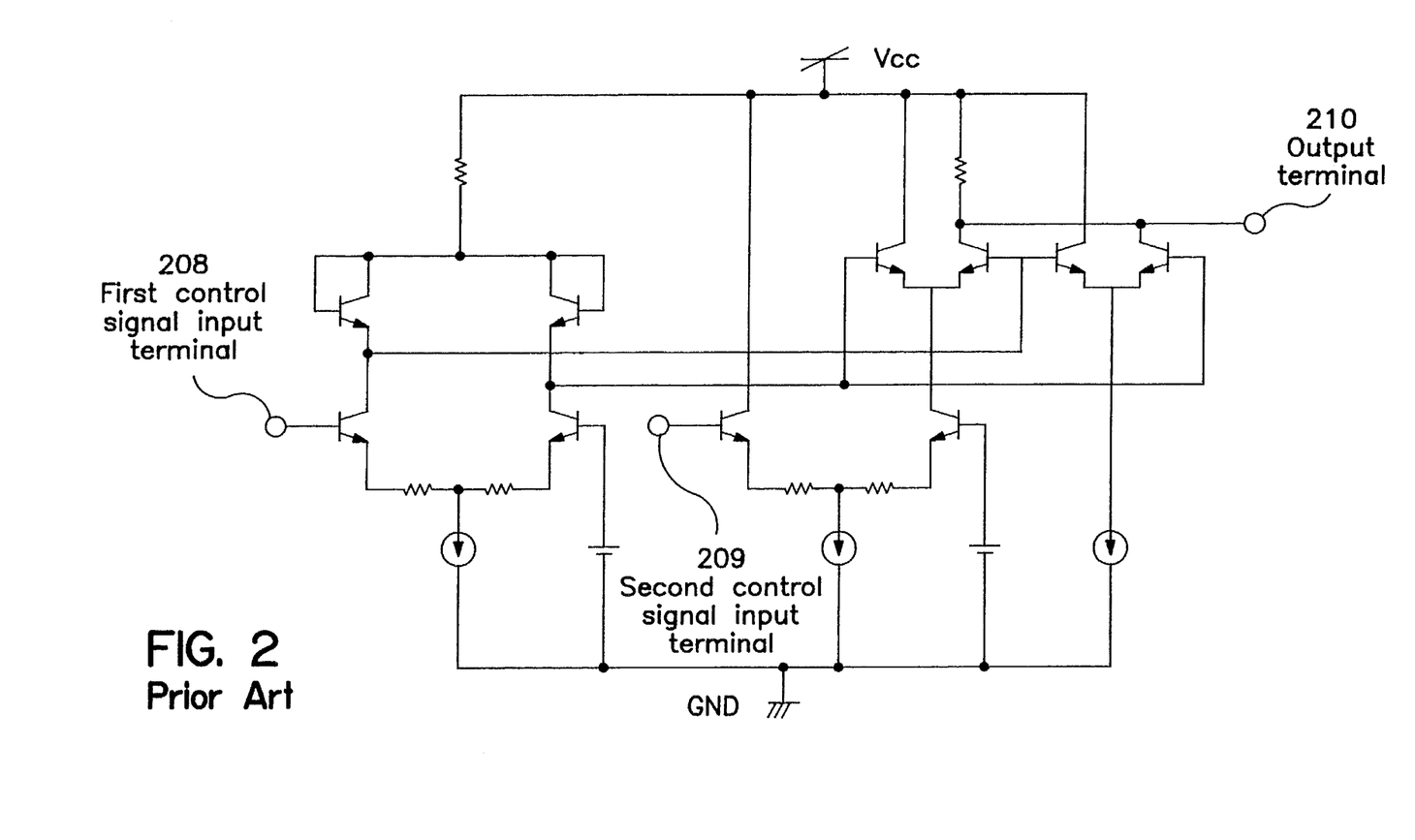
FIG. 2 is a circuit diagram of a coefficient multiplier 204 in a noise reducing apparatus in accordance with the prior art.
Figure 3:
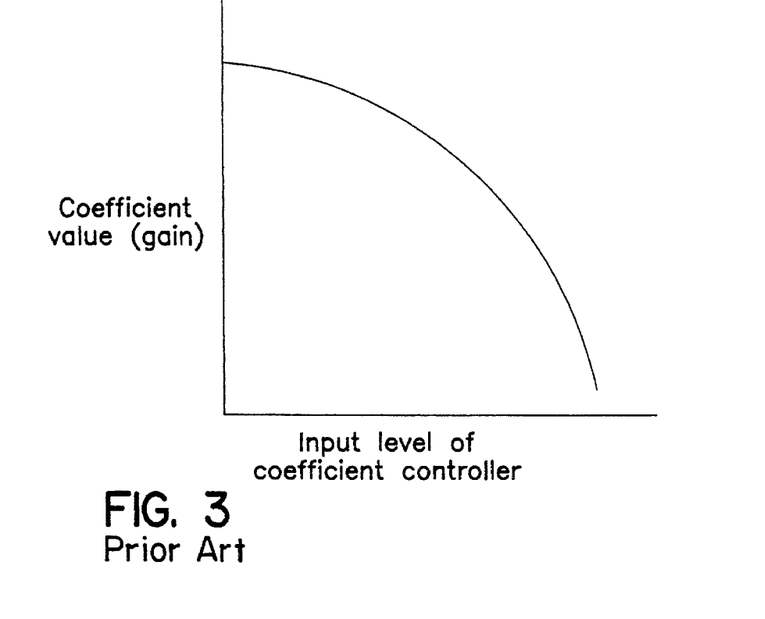
FIG. 3 is a graph showing a coefficient control characteristic of a coefficient multiplier 204 in a noise reducing apparatus in accordance with the prior art.

A noise reducing apparatus is accordance with the prior art is explained below with reference to FIG. 1 to FIG. 3. FIG. 1 is a block diagram of a noise reducing apparatus in accordance with the prior art. A color signal including noise is provided to a color signal input terminal 200 and is supplied from a color signal output terminal 201 via an adder 205. The output signal is provided to a 1H delay device 202 and is delayed by 1H, where H is equal to a horizontal scanning period. The 1H delayed color signal is subtracted from the input color signal at a first subtracter 203 to produce a vertical boundary color signal including noise.

The vertical boundary color signal including noise is obtained at a second subtracter 206 and then provided to a coefficient controller 207. At the coefficient controller 207, the noise component included in the input signal is clipped to produce a control signal corresponding to a level of the vertical boundary signal. The control signal is then provided to a coefficient multiplier 204. A circuit diagram, for example, of the variable coefficient multiplier 204 is shown in FIG. 2. The output of the coefficient controller 207 is provided to a first control signal input terminal 208 (shown in FIG. 2) as a control signal. The input signal is provided to a second control signal input terminal 209 which is gain controlled according to the control signal provided to the first control signal input terminal 208 to produce an output signal at output terminal 210. FIG. 3 shows the coefficient control characteristic, that is the gain control characteristic, of the coefficient controller 207 shown in FIG. 1.

However, in the prior art configuration discussed above, the gain control characteristic is constant against the signal level of the vertical boundary segment. As a result, downward color bleeding may easily occur for a vertical boundary signal with a small amplitude.

SUMMARY OF THE INVENTION

The present invention relates to a noise reducing apparatus capable of varying the coefficient control characteristic of the coefficient multiplier.

The exemplary embodiment of the noise reducing apparatus of the present invention includes a variable coefficient multiplier using a variable gain amplifier and a correlation detector capable of varying the coefficient control characteristic of the variable coefficient multiplier against the amplitude of a difference signal between the input video signal and the output signal of the delay device.

Accordingly, the coefficient control characteristic of the variable coefficient multiplier may be easily set or varied. Further, deterioration of the noise reducing effect caused by improper detection of the vertical boundary area due to noise may be suppressed. In addition, downward color bleeding of a small vertical boundary signal is reduced.

DETAILED DESCRIPTION OF THE INVENTION

Figure 4:
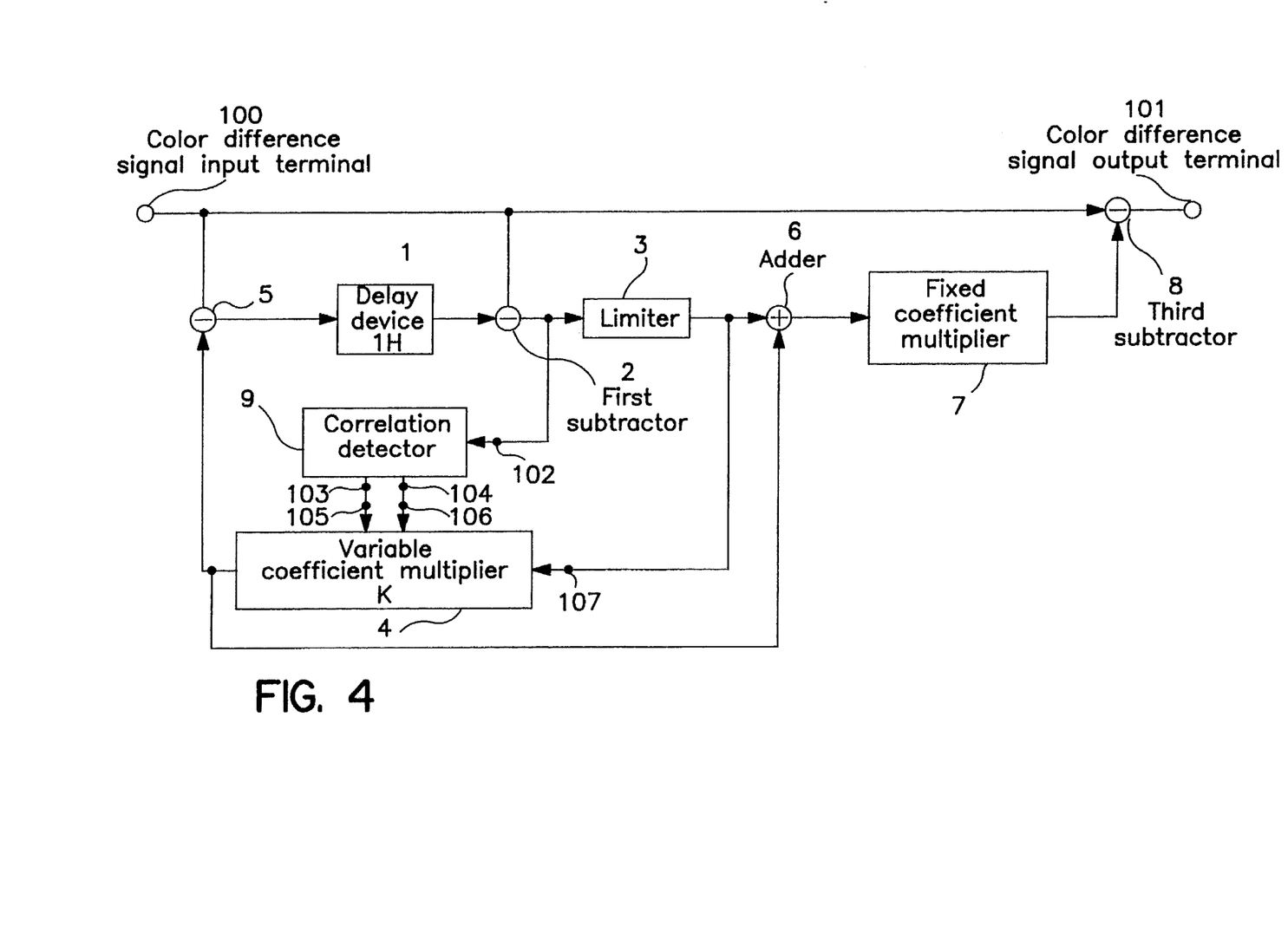
FIG. 4 is a block diagram of a noise reducing apparatus in accordance with an exemplary embodiment of the present invention.

FIG. 4 is a block diagram of a noise reducing apparatus in accordance with an exemplary embodiment of the present invention. A vertical boundary signal including noise is produced by the first subtracter 2 by subtracting the output signal of a delay device 1 from a color difference signal (hereinafter called a difference signal) which had been provided to a color difference signal input terminal 100. The high level portion of the vertical boundary signal of the difference signal is clipped at a limiter 3.

A variable coefficient multiplier 4 is controlled by a correlation detector 9 so that a coefficient value k is made small for the vertical boundary signal. The output of limiter 3 is provided to the variable coefficient multiplier 4 where the vertical boundary signal component is suppressed and the noise component is multiplied by a predetermined coefficient value k.

The output of the variable coefficient multiplier 4 is subtracted from the color difference signal at a second subtracter 5 and provided to the delay device 1. The output of the variable coefficient multiplier 4 and the output of the limiter 3 are also added at an adder 6. The output of adder 6 is multiplied by 0.5 at a fixed coefficient multiplier 7 and then subtracted from the color difference signal supplied through the color difference signal input terminal 100 at a third subtracter 8. The output signal of the third subtracter 8 has a noise component which is reduced as compared to the input color difference signal. The output signal of the third subtracter is provided to a color difference signal output terminal 101.

Figure 5:
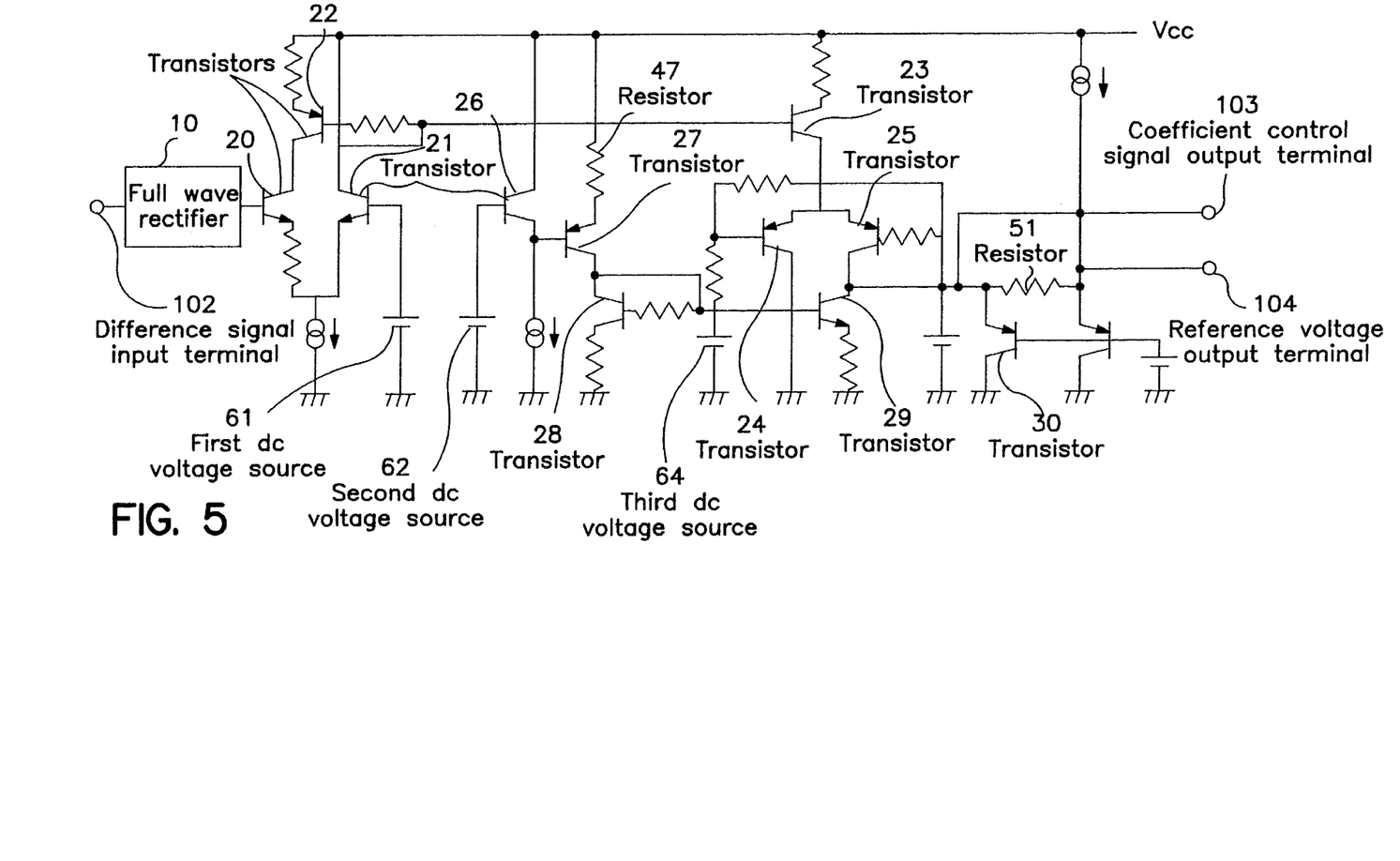
FIG. 5 is a circuit diagram of the correlation detector 9 shown in FIG. 4 of the noise reducing apparatus in accordance with the exemplary embodiment of the present invention.

FIG. 5 is a circuit diagram of the correlation detector 9 in the noise reducing apparatus in accordance with the exemplary embodiment of the present invention. The output signal of the first subtracter 2 is provided to a difference signal input terminal 102. This signal includes a vertical boundary signal component from the input color difference signal and a noise component. A lower portion, which is lower than a pedestal level, of the color difference signal is provided to the difference signal input terminal 102 and folded back at a full wave rectifier 10. The output signal of the full wave rectifier 10 is provided to the base of a transistor 20. The base potential of a transistor 21 is made to have the same potential as that of the transistor 20 by a first dc voltage source 61.

Transistor 20 and transistor 21 form a differential amplifier. The output of transistor 20 is supplied to the commonly connected emitters of transistors 24 and 25 through a current mirror circuit composed of transistors 22 and 23. The collector output of transistor 25 is controlled by a voltage of a third dc source 64 which is supplied to the base of the transistor 24.

The output signal current of transistor 25 which is gain controlled is converted to a voltage signal through a resistor 51 which is provided to a coefficient control signal output terminal 103 as a coefficient control signal. Then, the coefficient control signal is supplied to a coefficient control signal input terminal 105 (shown in FIG. 6) in the variable coefficient multiplier 4. The dc voltage of a second dc voltage source 62 is voltage converted through transistors 26 and 27 and a resistor 47. The current mirror circuit composed of transistors 28 and 29 lower the dc potential of the coefficient control signal at coefficient control signal output terminal 103 at a level lower than the reference voltage which is provided from reference voltage output terminal 104. A transistor 30 clips the coefficient control signal provided from the collector of transistor 25 at the reference voltage of the reference voltage output terminal 104.

Figure 6:
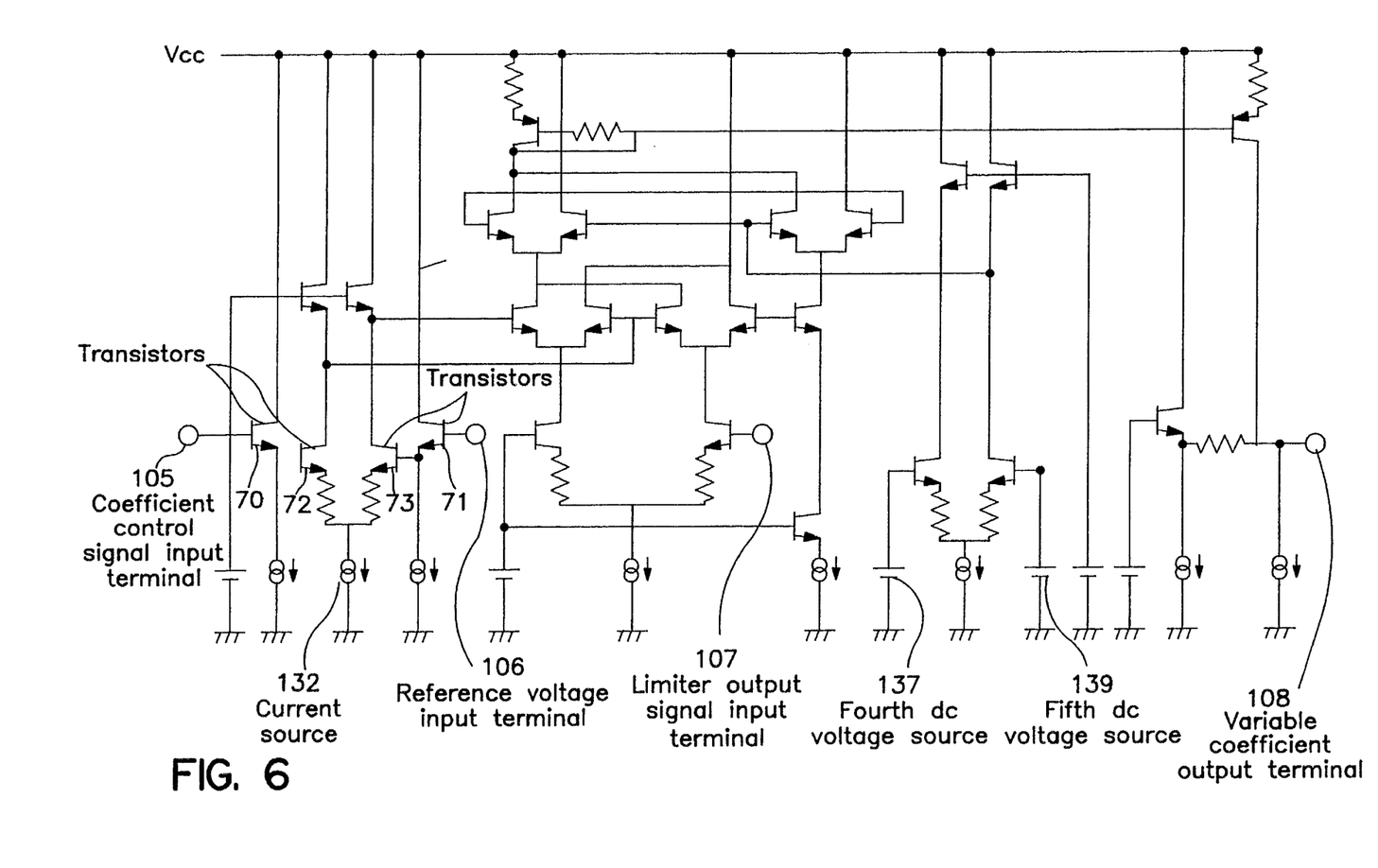
FIG. 6 is a circuit diagram of a variable coefficient multiplier 4 shown in FIG. 4 in a noise reducing apparatus in accordance with the exemplary embodiment of the present invention.

FIG. 6 shows a circuit diagram of the variable coefficient multiplier 4 in the noise reducing apparatus in accordance with the exemplary embodiment of the present invention.

The coefficient control signal output terminal 103 and the reference voltage output terminal 104 (both shown in FIG. 5) are connected to a coefficient control signal input terminal 105 and a reference voltage input terminal 106 (both shown in FIG. 5) which are connected to a coefficient control signal input terminal 105 and a reference voltage input terminal 106 (both shown in FIG. 6), respectively. The output signal of limiter 3 (shown in FIG. 4) is provided to a limiter output signal input terminal 107 (shown in FIG. 6). The voltage of a fifth dc voltage source 139 determines the maximum value of the coefficient. The coefficient value is 0.5 when the voltage of the fifth dc voltage source 139 is equal to the voltage of the fourth dc voltage source 137.

In operation, the coefficient control signal of the coefficient control signal input terminal 105 and the reference voltage at the reference voltage input terminal 106 are supplied to the base of a transistor 72 and to the base of a transistor 73 via transistor 70 and transistor 71, respectively. Transistors 72 and 73 form a differential amplifier, and when the base potential of transistor 72 and the base potential of transistor 73 are equal to each other, the coefficient value is 0.

The coefficient value becomes proportionedly bigger as the base potential of transistor 72 becomes lower than the base potential of transistor 73. When all the current from the current source 132 flows through transistor 73 (i.e. no current flows through transistor 72), the coefficient becomes a maximum value which is determined by the fifth dc voltage source 139.

The variable coefficient value k is supplied from the variable coefficient output terminal 108 and is provided to second subtracter 5 and adder 6. In the circuit shown in the FIG. 5, it is possible to make the coefficient value k not affected by the noise component included in the control signal, by setting the dc voltage level of the coefficient control signal.

The dc potential at the reference voltage output terminal 104 is nearly constant. The dc potential at the coefficient control signal output terminal 103 is variable and contains the (vertical) boundary component and the noise component. Because the coefficient control signal output terminal 103 and the reference voltage output terminal 104 (both shown in FIG. 5) are connected to the coefficient control signal input terminal 105 and the reference voltage input terminal 106 (both shown in FIG. 6), respectively, the noise component is pushed out of the dynamic range of the differential amplifier (shown in FIG. 6) composed of transistors 72 and 73 by lowering the dc potential of the coefficient control signal output terminal 103 against the dc potential of the reference voltage output terminal 104. The transistor 76 is cut off. Thus, it is possible to make the coefficient value not affected by the noise component included in the control signal.

Figure 7:
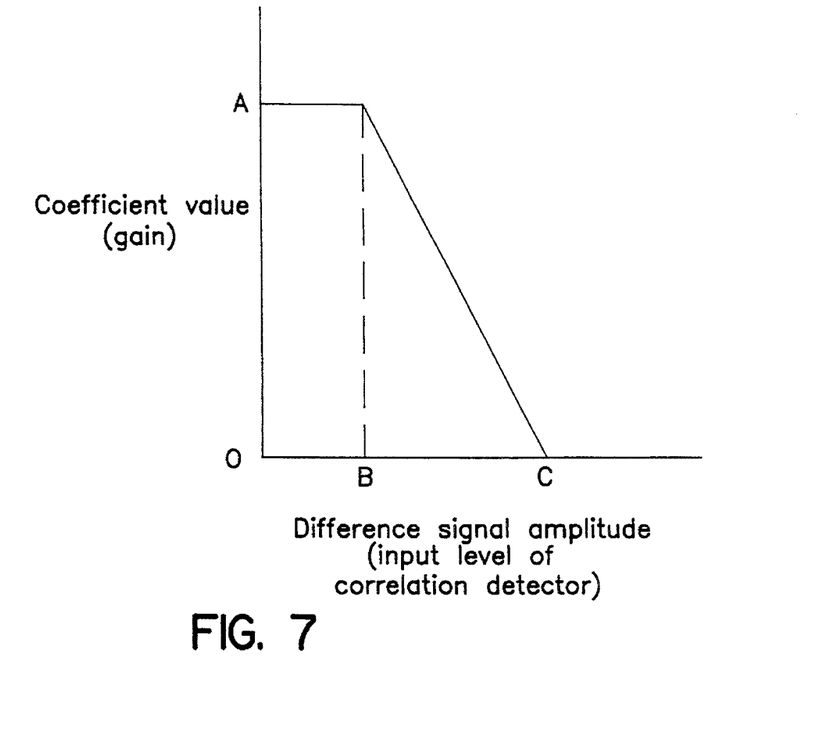
FIG. 7 is a graph showing a coefficient control characteristic of the variable coefficient multiplier 4 shown in FIG. 4 in a noise reducing apparatus in accordance with the exemplary embodiment of the present invention.

Because the amplitude of the control signal is variable, the varying rate of the coefficient k against the amplitude of the vertical boundary signal included in the control signal can also be made variable. FIG. 7 is a graph showing a coefficient control characteristic of a variable coefficient multiplier 4 in the noise reducing apparatus in accordance with the exemplary embodiment of the present invention. The abscissa is an amplitude of the difference signal and the ordinate is a coefficient value k of the variable coefficient multiplier 4. The maximum value of the coefficient, the control starting point, and the point where the coefficient becomes 0 are marked A, B, and C, respectively. These three points can be made variable.

According to the exemplary embodiment of the present invention, by varying the coefficient control characteristic of the variable coefficient multiplier, the problem of not detecting the vertical boundary signal as a result of noise may be reduced. In addition, the coefficient value can be adequately controlled even against a small vertical boundary signal, and the downward color bleeding of the vertical boundary area of the color difference signal may be suppressed.

The input signal, the color difference signal, may be, for example, a luminance signal.

Figure 8:
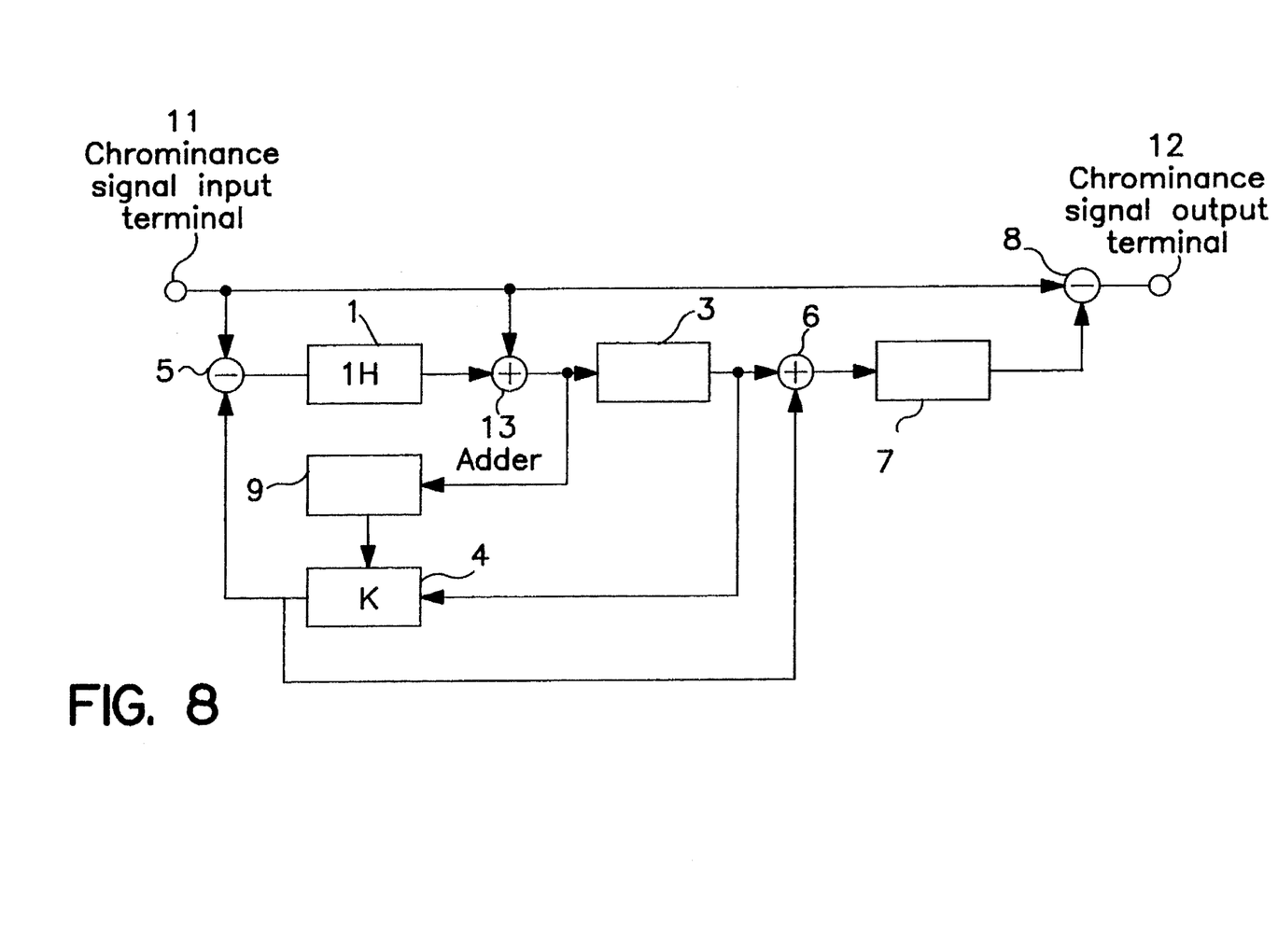
FIG. 8 is a block diagram of a noise reducing apparatus in accordance with another exemplary embodiment of the present invention.

Another exemplary embodiment of the present invention is explained with reference to FIG. 8. In this case, the input signal is a chrominance signal instead of a color difference signal as discussed in the previous exemplary embodiment of the present invention. This exemplary embodiment includes a chrominance signal input terminal 11, a chrominance signal output terminal 12, and an adder 13. The remaining blocks are similar to those used in FIG. 4 with like reference numerals.

Because the color subcarrier frequency is an odd number multiplication of the horizontal scanning frequency, the chrominance signal alternates its phase every horizontal period. Therefore, by replacing subtracter 2 in the previous exemplary embodiment (shown in FIG. 4) with the adder 13 (shown in FIG. 8), the vertical boundary area and the noise component of the chrominance signal may be obtained. The remaining parts in the circuit network are similar to the previous exemplary embodiment.

Accordingly, the same results may be obtained for a chrominance signal as a color difference signal.

According to the exemplary embodiments of the present invention, by varying the coefficient control characteristic of the variable coefficient multiplier, improper detection of the vertical boundary signal as a result of noise may be reduced. In addition, the downward color bleeding for a small vertical boundary signal may be reduced.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed:

1. A noise reducing apparatus comprising:

delay means for delaying a first video signal by one horizontal period to produce a delayed video signal;

first subtracting means for subtracting the delayed video signal from an input color difference signal to produce a second video signal;

limiting means for clipping said second video signal at a designated level to produce a clipped video signal;

variable coefficient multiplying means for multiplying said clipped signal by a variable coefficient value which is between 0 and 1 to produce a third video signal;

second subtracting means for subtracting the third video signal from said input color difference signal to produce said first video signal and for providing said first signal to said delay means;

adding means for adding said clipped video signal and said third video signal to produce a fourth video signal;

coefficient multiplying means for multiplying said fourth video signal by a fixed coefficient value which is between 0 and 0.5 to produce a fifth video signal;

third subtracting means for subtracting said fifth video signal from said input color difference signal to produce a noise reduced color difference signal; and correlation detecting means, responsive to said second signal, for controlling said variable coefficient multiplying means by:

decreasing the variable coefficient value of said variable coefficient multiplying means, in response to an increase in said second video signal, and increasing the variable coefficient value of said variable coefficient multiplying means, in response to a decrease in said second video signal.

2. A noise reducing apparatus comprising:

delay means for delaying a first luminance signal by one horizontal period to produce a delayed luminance signal;

first subtracting means for subtracting the delayed luminance signal from an input luminance signal to produce a second luminance signal;

limiting means for clipping said second luminance signal at a designated level to produce a clipped luminance signal;

variable coefficient multiplying means for multiplying said clipped luminance signal by a variable coefficient value which is between 0 and 1 to produce a third luminance signal;

second subtracting means for subtracting the third luminance signal from said input luminance signal to produce said first luminance signal and for providing said first luminance signal to said delay means;

adding means for adding said clipped luminance signal and said third luminance signal to produce a fourth luminance signal;

coefficient multiplying means for multiplying said fourth luminance signal by a fixed coefficient value which is between 0 and 0.5 to produce a fifth luminance signal;

third subtracting means for subtracting said fifth luminance signal from said input luminance signal to produce a noise reduced luminance signal; and correlation detecting means, responsive to said second luminance signal, for controlling said variable coefficient multiplying means by:

decreasing the variable coefficient value of said variable coefficient multiplying means in response to an increase in said second luminance signal, and increasing the variable coefficient value of said variable coefficient multiplying means in response to a decrease in said second luminance signal.

3. A noise reducing apparatus comprising:

delay means for delaying a first chrominance signal by one horizontal period to produce a delayed chrominance signal;

first adding means for adding the delayed chrominance signal and an input chrominance signal to produce a second chrominance signal;

limiting means for clipping said second chrominance signal at a designated level to produce a clipped chrominance signal;

variable coefficient multiplying means for multiplying said clipped chrominance signal by a variable coefficient value which is between 0 and 1 to produce a third chrominance signal;

first subtracting means for subtracting the third chrominance signal from said input chrominance signal to produce said first chrominance signal and for providing said first chrominance signal to said delay means;

second adding means for adding said clipped chrominance signal and said third chrominance signal to produce a fourth chrominance signal;

coefficient multiplying means for multiplying said fourth chrominance signal by a fixed coefficient value which is between 0 and 0.5 to produce a fifth chrominance signal;

second subtracting means for subtracting said fifth chrominance signal from said input chrominance signal to produce a noise reduced chrominance signal; and correlation detecting means, responsive to said second chrominance signal, for controlling said variable coefficient multiplying means by:

decreasing the variable coefficient value of said variable coefficient multiplying means in response to an increase in said second chrominance signal, and increasing the variable coefficient value of said variable coefficient multiplying means in response to a decrease in said second chrominance signal.

* * * * *